United States Patent [19]

Aulich et al.

[11] 4,118,212

[45] Oct. 3, 1978

[54] DOUBLE CRUCIBLE SYSTEM FOR THE PRODUCTION OF LIGHT CONDUCTING FIBERS

[75] Inventors: Hubert Aulich, Munich; Josef Grabmaier, Kempfenhausen, both of Germany

[73] Assignee: Siemens Aktiengesellschaft, Berlin & Munich, Germany

[21] Appl. No.: 852,236

[22] Filed: Nov. 17, 1977

[30] Foreign Application Priority Data

Nov. 30, 1976 [DE] Fed. Rep. of Germany ....... 2654308

[51] Int. Cl.² ............................................. C03B 37/02
[52] U.S. Cl. ..................................... 65/3 A; 65/11 W; 65/13; 65/121; 65/DIG. 7
[58] Field of Search ............ 65/3 A, 121, 13, DIG. 7, 65/11 W

[56] References Cited

U.S. PATENT DOCUMENTS 4,040,807 8/1977 Midwinter et al. ................. 65/121 X

FOREIGN PATENT DOCUMENTS

| 1,596,395 | 3/1971 | Fed. Rep. of Germany. |
| 1,185,779 | 1/1965 | Fed. Rep. of Germany. |
| 4,830,126 | 9/1973 | Japan ......................................... 65/3 A |
| 392,011 | 1/1974 | U.S.S.R. .................................... 65/3 A |

OTHER PUBLICATIONS

Optische Nachrichtentecnik, Hans-Georg, pp. 39, 40, Berlin, 1976.

*Primary Examiner*—Robert L. Lindsay, Jr.
*Attorney, Agent, or Firm*—Hill, Gross, Simpson, Van Santen, Steadman, Chiara & Simpson

[57] ABSTRACT

A double crucible system is disclosed for the production of light conducting fibers. The system has an interior crucible which can be axially displaced in relation to the exterior crucible which is concentric thereto. The spacing of the crucible jets in the exterior and interior crucible in relation to one another is thereby altered so that the proportion of the cross-sections of the fiber core and the fiber casing is continuously altered.

19 Claims, 1 Drawing Figure

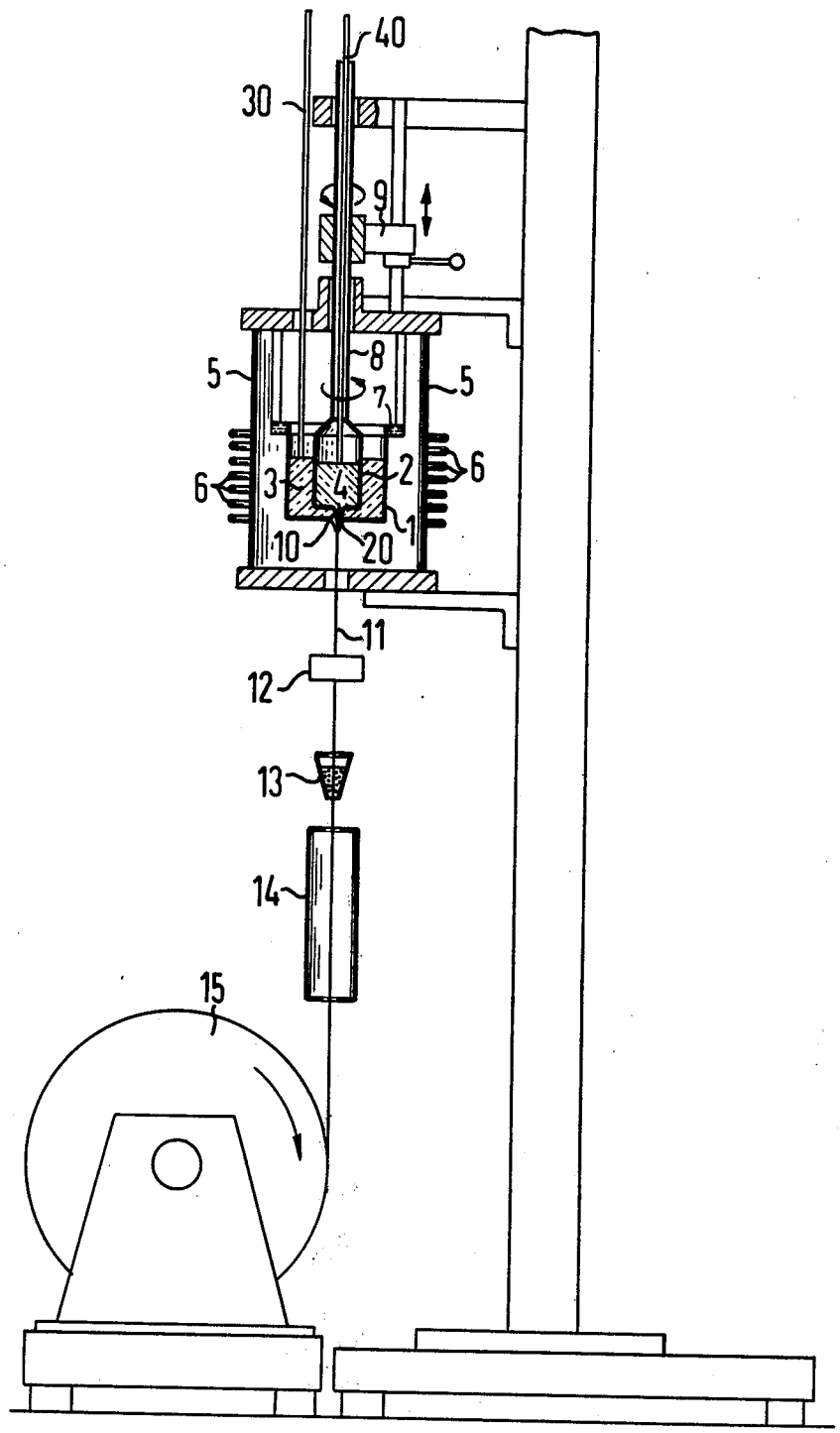

DOUBLE CRUCIBLE SYSTEM FOR THE PRODUCTION OF LIGHT CONDUCTING FIBERS

BACKGROUND OF THE INVENTION

The invention relates to a double crucible system for the production of light conducting fibers.

It is already known to draw light conducting fibers from a double crucible. For example, the publication by H. G. Unger, "Optische Nachrichtentechnik", 1976 Berlin, describes a device of this type under the key word "double nozzle method" on pages 39 and 40.

Previously, light conducting fibers produced in accordance with the double crucible method possessed a predetermined ratio between the cross-sections of the fiber cores and the fiber casings. This ratio of the cross-sections was determined by the structure of the double crucible. In order to produce fibers having a different ratio of the casing and core cross-sections, it was previously necessary to employ a different double crucible.

As the double crucibles are generally manufactured from highly pure platinum or platinum-rhodium alloys in order to avoid pollution of the glass melts by the crucible material, double crucibles of this type are extremely expensive and this has an unfavorable influence upon fiber cost.

SUMMARY OF THE INVENTION

An object of the invention is to provide a double crucible device with which it is possible to produce light conducting fibers in which the ratio between core and casing cross-sections can be set virtually arbitrarily.

This object is realized by a double crucible system which, in accordance with the invention, provides for an adjustment of the spacing between concentric nozzles on inner and outer crucibles.

Thus, in accordance with the invention, the two crucibles of the double crucible are axially displaceable relative to one another. As a result, the distance between the crucible nozzles of the two crucibles relative to one another changes, and accordingly the ratio of the cross-sections of the fiber core to the fiber casing changes also. The greater the distance between the crucible nozzles, the smaller is the core cross-section relative to the casing cross-section.

Advantageously, monomode and multimode fibers can be produced with the double crucible system in accordance with the invention. In monomode fibers, the core has a particularly small cross-section relative to the casing, and furthermore the core possesses only a slightly higher index of refraction than the fiber casing. In multimode fibers, on the other hand, the core has a relatively large cross-section and the difference between the indices of refraction between the core and casing is relatively great.

In an advantageous embodiment of the double crucible system, in addition to a change in the distance between the two crucibles, it is also possible for the inner crucible to rotate about its axis. In this way an agitation effect can advantageously be achieved. As a result it is possible to eliminate gas bubbles which can settle on the crucible walls during the filling of the crucibles.

This agitation effect also has a favorable influence upon the homogenization of the temperature in the glass melt. Temperature fluctuations in the melt can lead to undesirable changes in index of refraction. As these fluctuations can be avoided by the crucible rotation, light conducting fibers exhibiting very low scattering losses can be produced with a double crucible system of this kind.

Advantageously the double crucible system can be designed in such a manner that the crucibles can be continuously loaded, even during the rotation of the crucibles, so that it is possible to produce light conducting fibers having arbitrary lengths.

BRIEF DESCRIPTION OF THE DRAWING

The FIGURE illustrates an exemplary embodiment in partial cross-section of a double crucible system in accordance with the invention.

DESCRIPTION OF THE PREFERRED EMBODIMENTS

In accordance with the invention, the double crucible system possesses an outer crucible 1 and an inner crucible 2. The outer crucible contains a glass melt 3, and the inner crucible a glass melt 4. In order to avoid pollution of the surfaces of the glass melts, and in order to be able to check the atmosphere over the melts, the double crucible is arranged in a capsule 5 consisting of quartz glass. The crucible can be heated with an induction coil 6. The outer crucible 1 is suspended on a water-coded flange 7. The inner crucible 2 is suspended on a tubular shaft 8 which, in accordance with an advantageous embodiment, is rotatable as indicated by corresponding arrows. By means of a shaft suspension 9 which is adjustable in height, the shaft and the inner crucible can be adjusted with respect to their height relative to the outer crucible. In this way it is possible to adjust the distance of the nozzle 10 of the outer crucible relative to the nozzle 20 of the inner crucible. The crucibles can be loaded through glass rods 30, 40. These glass rods which, for example, have a diameter of 4 mm to 10 mm, are slowly inserted into the crucibles. The glass rod 40 is inserted into the inner crucible through the tubular shaft 8.

The crucible nozzles can be closed off by means of a seal (not illustrated). As soon as the glass melts have been brought to the drawing temperature, this seal is removed so that a light conducting fiber 11 can be drawn. A drawing drum 15 is provided for this purpose.

A thickness measuring device 12 can be provided for measuring the thickness of the light conducting fibers.

If it is desired to provide the light conducting fibers with an additional protective casing, a coating bath 13 can be provided. Polyvinyliden chloride (trade name: Kynar) is a suitable material, for example, for a protective casing. A drying furnace 14 can be used to achieve a more rapid hardening of the protective casing.

The crucibles 1 and 2 must consist of a material which does not pollute the glass melts in the crucible. Suitable materials for the crucibles are, for example, platinum and iridium, which metals can also be alloyed with rhodium.

First investigations have indicated that highly pure aluminum oxide is also suitable as a crucible material. As yet no corrosion phenomena have been able to be established in this material and the pollution in the glass melt caused by this crucible material is negligible.

Glass types of the system $Na_2O$-$K_2O$-$PbO$-$SiO_2$ have been employed for testing the double crucible system in accordance with the invention.

These glass types possess the desired property of exhibiting no tendency to crystallization within a wide temperature range, as known from the publication by W. Vogel, "Struktur and Kristallisation der Glaser,"

Leipzig 1965. Furthermore, these glass types can be drawn at relatively low temperatures, this being advantageous as it is thus possible to maintain pollution due to the crucible material at a particularly low level. Furthermore, with these types of glass, it is possible to change the index of refraction within a wide range by altering the PbO concentration. Thus it is easily possible, with these types of glass, to achieve a wide difference in index of refraction between the casing and the core of the later formed light conducting fiber. Furthermore these glass types have a good chemical and thermal stability and furthermore good mechanical properties.

The glass rods 30 and 40 provided for the loading of the crucibles can be manufactured in the following manner. The highly pure raw materials of the glass system are fused in the desired mixture ratio in platinum crucibles or in highly ceramic crucibles. This fusion process is carried out in an argon-oxygen atmosphere, keeping the melt times as short as possible in order to ensure that the melt is polluted by the crucible material to the least extent possible. The glass melt is homogenized by agitation with a platinum rod or ceramic rod. Now glass rods can be directly drawn out of a crucible opening. During testing, glass rods having a thickness of between 4 and 10 mm and a length of up to 1 m were used. The fluctuation in thickness of the rods was in the region of ± 3%.

Absorption measurements carried out on the drawn light conducting fibers have indicated that the absorption losses of the light conducting fibers are dependent both upon the purity of the raw materials and upon the crucible material and the atmosphere employed during the melting process.

It has been shown that glasses melted in platinum crucibles may assume a yellow color. However, the glass melts can be rendered transparent again by blowing oxygen through the melt. The yellow color is probably due to platinum dissolved in colloidal form, which is oxidized by the oxygen, thus rendering the melt transparent again.

Obviously the platinum is extremely homogeneously distributed in the melt, which means that the platinum does not produce any scattering centers within the drawn light conducting fiber.

When crucibles consisting of iridium and a protective atmosphere consisting of argon were used to which were added a few percent of oxygen, a colorless glass melt was always achieved. However, inclusions of iridium or iridium oxides in the glass melt result in a relatively high number of scattering centers which led to relatively high losses in the later formed light conducting fiber, although these losses can be disregarded in the case of transmission paths of not too great a length.

The glass rods which have been produced in this way are now introduced into the double crucible system and are fused. A protection from pollution is provided by a protective atmosphere, e.g. argon or nitrogen in the capsule 5. As soon as the glass melts have been brought to drawing temperature, a light conducting fiber can be drawn off.

The double crucible system in accordance with the invention can advantageously also be used to produce gradient index profile light conducting fibers. For this purpose melts in which a sufficiently strong diffusion occurs at a common boundary surface are used for the fiber core and the fiber casing. In particular, between the nozzles of the double crucible, in a high temperature range, the melts partially diffuse into one another at their common boundary surface. By adjusting the spacing between the nozzles — this fundamentally governs the period of time in which diffusion takes place — the index of refraction profile can be caused to become parabolic, for example, The double crucible system in accordance with the invention and the aforementioned types of glass are particularly suitable for the production of light conducting fibers whose absorption loss lies at a few dB/km, and the numerical aperture of which is 0.2 or higher. Light conducting fibers having lower absorption losses are in fact important for optical long distance traffic communications systems, although in many applications the degree of the absorption losses is less important than a high numerical aperture. Such applications consist, for example, of data processing, close range traffic communications systems, and air traffic applications. For a range of, for example 100 m, a light conducting fiber possessing an absorption of 50 dB/km and a numerical aperture of 0.47, in combination with a luminescence diode, permits the transmission of a considerably higher light power than when a light conducting fiber with 5 dB/km and a numerical aperture of 0.2 are used. Furthermore, light conducting fibers having a large, numerical aperture have the particular advantage that microbending in the light conducting fiber lead to only low additional losses.

The double crucible system in accordance with the invention is also suitable for the production of fibers from synthetic materials. In this case the crucibles can also consist of glass.

Although various minor modifications may be suggested by those versed in art, it should be understood that I wish to embody within the scope of the patent warranted hereon, all such embodiments as reasonably and properly come within the scope of my contribution to the art.

We claim as our invention:

1. A double crucible system having two concentric melting crucibles for the production of a light conducting fiber, comprising: an inner crucible means for accommodating a melt for a core of the light conducting fiber, an outer crucible means surrounding the inner crucible means for accommodating a melt for a casing of the light conducting fiber, the inner and outer crucible means having concentric nozzle means for drawing off a light conducting fiber, the inner crucible means being arranged so that the distance between the concentric nozzles is variable, the inner crucible means being arranged to be rotatable and means to rotate said inner crucible means.

2. A double crucible system having two concentric melting crucibles for the production of a light conducting fiber, comprising: an inner crucible means for accommodating a melt for a core of the light conducting fiber, an outer crucible means surrounding the inner crucible means for accommodating a melt for a casing of the light conducting fiber, the inner and outer crucible means having concentric nozzle means for drawing off a light conducting fiber, the inner crucible means having means to adjust its height relative to the outer crucible means so that the distance between the concentric nozzles is variable, adjusting means being provided comprising a tubular shaft connecting to a top portion of the inner crucible means, said tubular shaft also having a glass supply inlet and means to rotate said inner crucible means.

3. A system as claimed in claim 1, characterized in that the inner crucible means is suspended on a tubular shaft.

4. A system as claimed in claim 1, characterized in that the inner and outer crucible means are arranged in a capsule.

5. A system as claimed in claim 1, characterized in that glass rods are provided for loading the crucibles.

6. A system as claimed in claim 5, characterized in that said glass rods comprise glass types of the system $Na_2O-K_2O-PbO-SiO_2$.

7. A double crucible system for the production of a light conducting fiber having a core and an outer casing, comprising:
an inner crucible means for producing the core and having a glass supply inlet;
an outer crucible means for producing the outer casing and having a glass supply inlet, said outer crucible means surrounding said inner crucible means;
a casing formation nozzle on said outer crucible means being aligned with a core formation nozzle on said inner crucible means;
adjusting means for adjusting the spacing between the casing formation nozzle and the core formation nozzle; and
said adjusting means comprising a tubular shaft connecting to a top portion of the inner crucible means, said tubular shaft also comprising the glass supply inlet, said tubular shaft being arranged to rotate so as to permit rotation of the inner crucible means and means to rotate said inner crucible means.

8. A system as claimed in claim 2 characterized in that the inner crucible means is suspended on a tubular shaft.

9. The system of claim 7 in which a casing means sealingly surrounds the outer crucible means, said casing means having a top portion with a sealing aperture in which said tubular shaft is slidably positioned.

10. A double crucible system having two concentric melting crucibles for the production of a light conducting fiber, comprising: an inner crucible means for accommodating a melt for a core of the light conducting fiber, an outer crucible means surrounding the inner crucible means for accommodating a melt for a casing of the light conducting fiber, the inner and outer crucible means having concentric nozzle means for drawing off a light conducting fiber, the inner crucible means having means to adjust its height relative to the outer crucible means so that the distance between the concentric nozzles is variable and the inner and outer crucible means being arranged in a capsule and means to rotate said crucible means.

11. A system as claimed in claim 2 characterized in that the inner and outer crucible means are arranged in a capsule.

12. A system as claimed in claim 10 characterized in that the inner crucible means is suspended on a tubular shaft.

13. A system as claimed in claim 10 characterized in that glass rods are provided for loading the crucibles.

14. A system as claimed in claim 13 characterized in that said glass rods comprise glass types of the system $Na_2O-K_2O-PbO-SiO_2$.

15. The system of claim 10 in which adjusting means is provided comprising a tubular shaft connecting to a top portion of the inner crucible means, said tubular shaft also comprising a glass supply inlet.

16. The system of claim 15 in which a casing means sealingly surrounds the outer crucible means, said casing means having a top portion with a sealing aperture in which said tubular shaft is slidably positioned.

17. A system as claimed in claim 2 characterized in that glass rods are provided for loading the crucibles.

18. A system as claimed in claim 17 characterized in that said glass rods comprise glass types of the system $Na_2O-K_2O-PbO-SiO_2$.

19. The system of claim 2 in which a casing means sealingly surrounds the outer crucible means, said casing means having a top portion with a sealing aperture in which said tubular shaft is slidably positioned.

* * * * *